F. B. WILDMAN.
CIRCULAR KNITTING MACHINE.
APPLICATION FILED APR. 29, 1914.
1,216,900.
Patented Feb. 20, 1917.
4 SHEETS—SHEET 1.
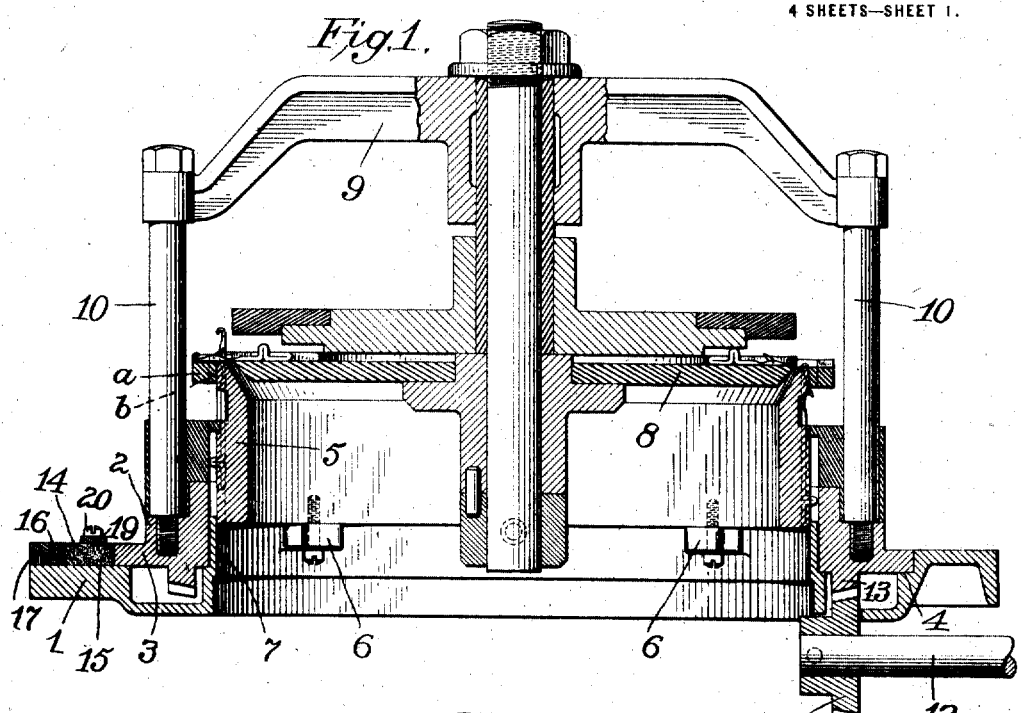
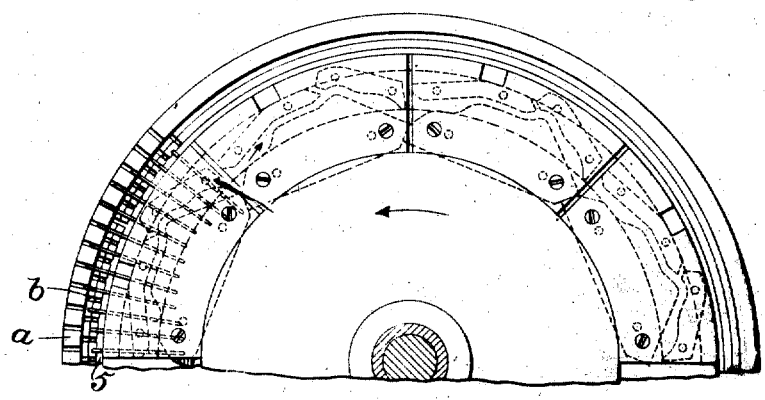
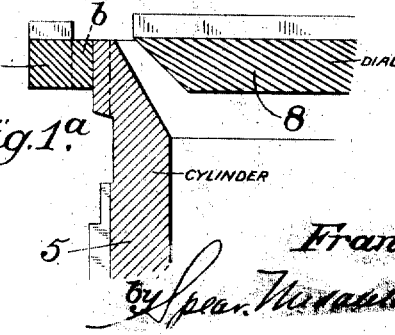
Attest:
Ewd L. Tolson
C. E. Parsons
Inventor
Frank B. Wildman

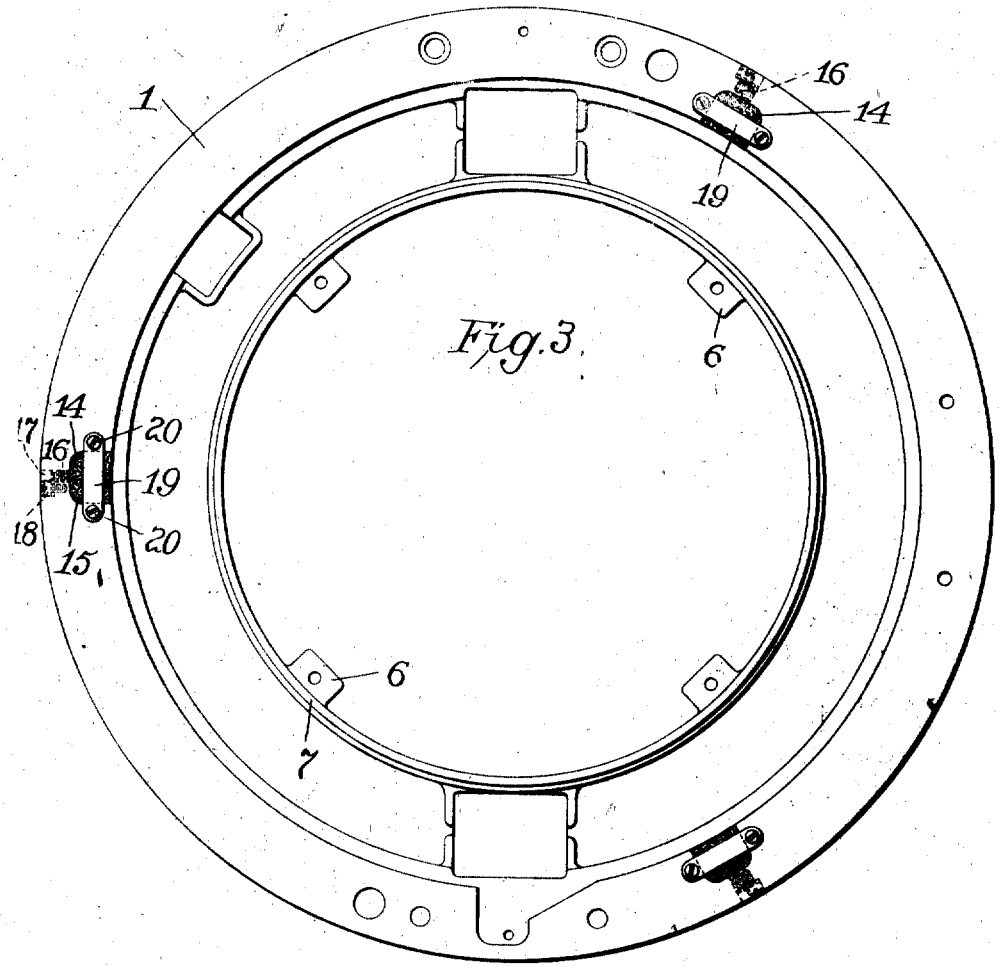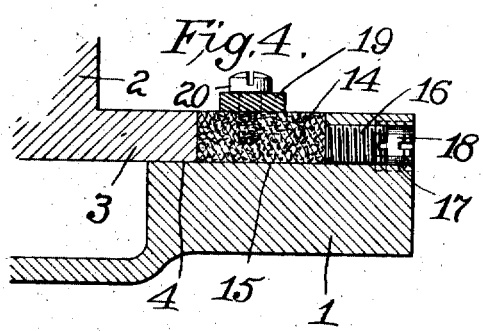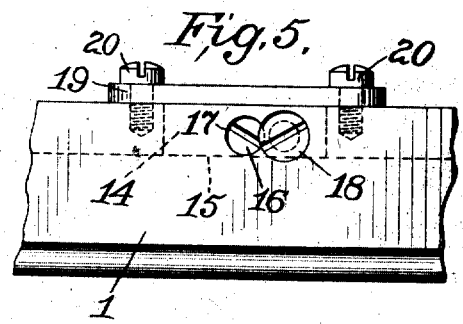

F. B. WILDMAN.
CIRCULAR KNITTING MACHINE.
APPLICATION FILED APR. 29, 1914.

1,216,900.

Patented Feb. 20, 1917.
4 SHEETS—SHEET 3.

Attest:
Ewd L. Tolson
C. E. Parsons

Inventor:
Frank B. Wildman,
by Spear, Middleton, Donaldson & Spear
Attys.

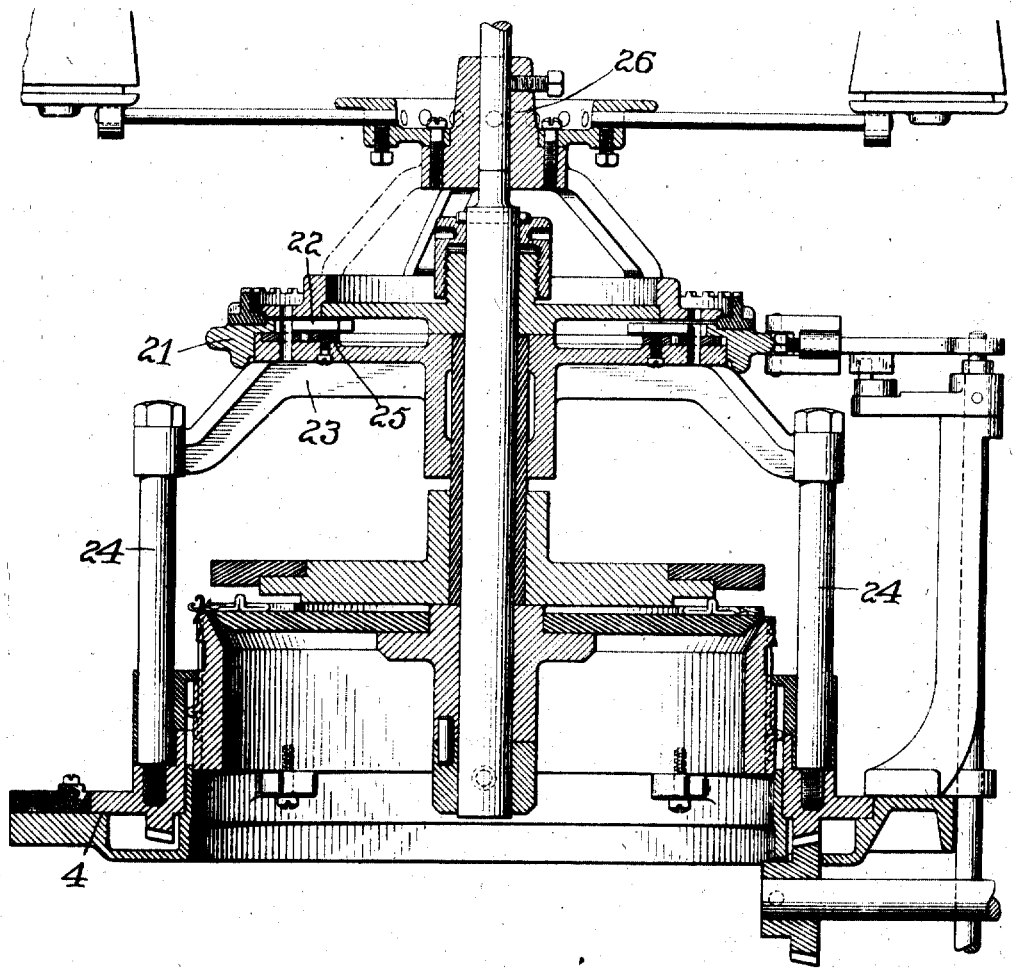

UNITED STATES PATENT OFFICE.

FRANK B. WILDMAN, OF NORRISTOWN, PENNSYLVANIA.

CIRCULAR-KNITTING MACHINE.

1,216,906.

Specification of Letters Patent.

Patented Feb. 20, 1917.

Application filed April 29, 1914. Serial No. 835,290.

*To all whom it may concern:*

Be it known that I, FRANK B. WILDMAN, citizen of the United States, residing at Norristown, Pennsylvania, have invented certain new and useful Improvements in Circular-Knitting Machines, of which the following is a specification.

One object of my invention is to provide a circular knitting machine of the cylinder and dial type having the cylinder and dial at right angles to each other in which dogs, sometimes used heretofore for holding the dial in fixed relation to the cylinder, are omitted. Machines without holding dogs between the cylinder and dial are not new, but my present invention is designed to present a simpler way of accomplishing the result.

Another object of my invention is to provide means for centering and maintaining the concentric relation of the rotary cam ring, dial and dial post, with the cylinder which is fixed to the base ring of the machine, this part of my invention contributing to the better accomplishment of the object first stated of providing a dogless machine in a simple manner.

The invention consists in the features of construction and combination and arrangement of parts hereinafter described and particularly defined by the appended claims.

In the drawings

Figure 1 is a vertical sectional view of my improved dogless machine; Figs. 1ª and 1ᵇ are views of details.

Fig. 2 is a plan view of part of the dial and cylinder of Fig. 1;

Fig. 3 is a plan view of the base ring of the machine;

Fig. 4 is a detail sectional view of one of the centering blocks in place;

Fig. 5 is a side view of Fig. 4 looking from the right thereof;

Fig. 9 is a sectional view showing the adjustable centering or registering feature of my invention combined in a dogless machine of another type from that disclosed above.

Figure 7:
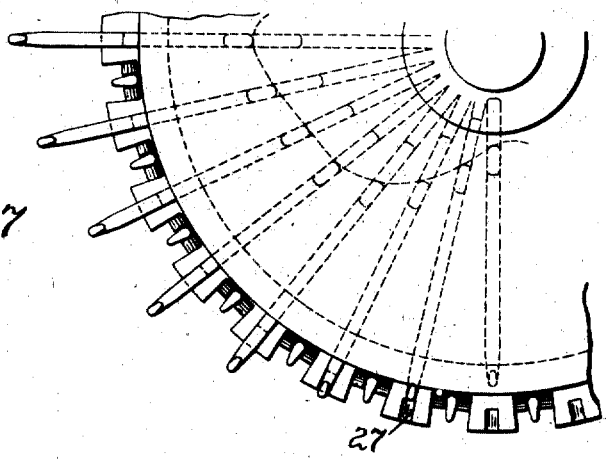
Fig. 7 is a plan view of the cylinder and dial of Fig. 6.

In these drawings, the numeral 1 is the fixed base ring. Within this base ring the cam ring 2 rotates, this preferably having a flange 3 resting on a shoulder 4 of the fixed base ring. The cam ring fits loosely into the base ring until it has been centered by the centering blocks described later. The needle cylinder 5 is supported in fixed position upon lugs 6 formed on the interior of the rim 7 of the fixed base which lies within the cam ring. The dial 8 is mounted on the dial post, this post, in turn, being supported in the yoke 9 held by the posts 10, the lower ends of which are screwed into the cam ring.

For holding the dial concentric with and in fixed relation to the cylinder, I utilize the dial needles themselves. For this purpose I fix on the outside of the cylinder a ring $a$ which is grooved radially to receive the dial needles when they are projected. These grooves are of such width as will receive the needles without much lateral play, and these projected needles are depended on to hold the dial against turning in relation to the cylinder.

In other words, they take the place of the dogs sometimes employed between the dial and cylinder for holding the former in fixed axial relation to the cylinder.

It is not necessary that the dial needle should bottom or rest on the bottom of its guide groove. Knitters have occasion to raise or lower the dial with relation to the cylinder. The slots in my ring ($a$) are of sufficient depth to allow for this adjustment.

The ring $a$ may be shrunk on the cylinder or secured in other ways. It is grooved at $b$ vertically to allow room in which the latches of the cylinder needles may work.

These internal teeth or grooves ($b$) perform an important duty. It is well known that in latch needle knitting, the latches wear loose and the cylinder needle latches when closing, will often fail to swing true with their stems, but they will swing sidewise and strike the dial needle stem (which is close beside it) and fail to close at the proper time, resulting in rupture of the loops making a hole in the fabric. Latches slightly bent, and others worn somewhat loose, are not necessarily worthless. They are to be found in common use in machines that have been in operation long enough for needles to show looseness in latches and rivets.

The grooves ($b$) or internal slots, present two smooth walls to guide and direct any and all loose latches, so that holes from latches striking the dial needles is prevented, this improvement prolonging the life of the needles and resulting in a great saving of waste fabric.

As above stated, the dial is mounted adjustably on the dial post, which is vertically adjustable in the yoke 9 supported by posts from the cam ring.

The cam ring 2 is driven by a gear wheel 11 on the shaft 12 meshing with a circular gear or rack 13 on the cam ring.

The maintenance of the true concentric relation between the dial and cylinder is of special importance where, as in the form of dogless machine above described, reliance is had upon the dial needles entering the grooves in the ring surrounding the cylinder, also in multiple feed machines where the dial needles should be central between the cylinder needles, and there should be no tendency, due to the eccentric condition of the dial supports or driving mechanism, to displace the dial needles in relation to the cylinder needles. Such tendency, if not resisted, results in defective fabric and great resistance to rotation of the machine. The sliding of the needles in slots out of alinement causes a braking action, and consequently great wear and waste of power results.

In order to avoid these objections, I employ means to centralize the dial with the cylinder, so that all the dial needles are in direct alinement with their corresponding drive grooves in the cylinder top or ring which surrounds the cylinder. Very slight eccentricity of the dial with the cylinder would result in some of the needles being far out of alinement with their corresponding driving slots, and if these needles were forced into these slots they would be bent, or would move with such resistance that wear of parts would result, and the power wasted would render the use of the system impracticable.

In the manufacture of the usual type of rib machines it is a difficult thing to make and assemble the several parts, viz. dial, dial spindle, yoke, posts, cam ring, cylinder and base ring, so that the dial is exactly concentric with the cylinder. In fact the result is rarely attained, and the dials generally wabble, also gyrate eccentric to the cylinder, due to very slight faults in making and fitting the many parts above mentioned. To overcome these difficulties and to simplify dogless rib machines, I have devised a simple way to centralize the dial so that not only do the dial needles register with their drive grooves, but my improvement does away with the common eccentric gyratory movement of the dial, and what is equally important perfect spacing of the dial needles between the cylinder needles during the knitting movements is maintained.

In order to avoid these objections, I employ a wear and centering piece or pieces 14 between the fixed and rotary members, and preferably I mount these upon the fixed base ring in pockets 15 formed therein. These wear pieces are preferably of fiber, and they are arranged to bear, in the particular construction shown, upon the edge of the base flange of the cam ring. They are adjustable by screws 16 screw-threaded into sockets 17 of the fixed base ring. These screws are held from turning by jam screws 18.

The wear blocks are held in the sockets by cross bars 19 overlying them, and held by the screws 20. The wear blocks being held in the pockets formed in the upper face of the fixed base ring, are readily accessible, and can be removed and replaced by simply removing the bars 19. I prefer to employ three centering pieces arranged at points 120° apart.

By the use of these centering pieces adjustable as described, the cylinder and dial members may be made to run true, and it will be observed that the remedial function is applied at the point where the inaccuracy is liable to occur, i. e., between the contact surfaces of the revolving and fixed members. These blocks will take up the thrust of the driving gear, take the wear, and being made of fiber, will reduce the heating effect. The adjustment can be readily made, it being possible to observe the immediate effect of the adjustment in securing the concentric relation of the fixed and rotary parts.

Figure 8:
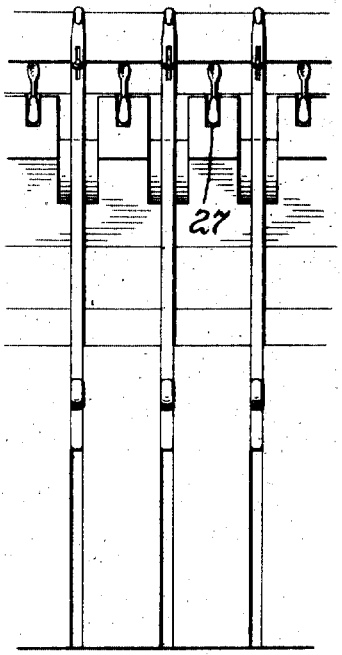
Fig. 8 is a side view of part of the cylinder and dial of Fig. 6.
Figure 6:
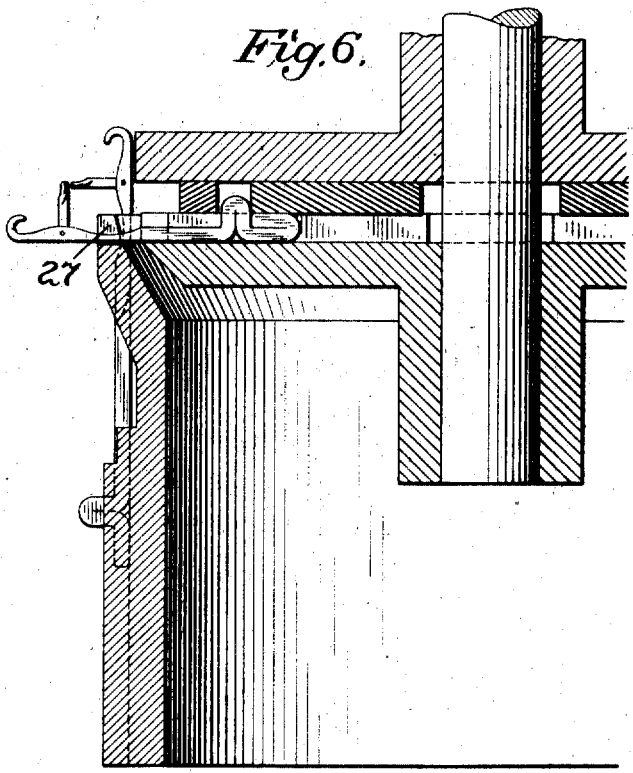
Fig. 6 is a sectional view of a dogless form of machine adapted to coarse gages.

As shown in Fig. 6, the registering and dogless feature of my invention I may carry out in connection with a coarse gage knitting machine without the use of the exterior grooved ring above described. In this case the cylinder top is provided with grooves 27 radially disposed and midway between the vertical grooves in which the cylinder needles work. These radial grooves receive the dial needles, as illustrated in Figs. 6, 7 and 8, and thus form the connection by which the dial is maintained in fixed relation to the cylinder circumferentially, but vertical adjustment is permitted in the usual way; the needles not being required to bottom in the grooves. While this arrangement is adapted for coarse gages because it is possible to provide the grooves in the cylinder between the cylinder needles for receiving the dial needles, for fine gage machines there is no room, and hence I resort to the exterior grooved ring which also allows vertical adjustment of the dial.

While I have shown the centering means as a necessary element in combination with my improved dogless connection between the cylinder and dial, such centering means may be used with other forms of connection such, for instance, as shown in Letters Patent of the United States #1,012,966, December 26, 1911, granted to G. L. Ballard, and Letters Patent of the United States granted to Wildman & Ballard, June 22d, 1915, No. 1,144,273.

Such a form of machine is shown in Fig. 9, in which the encircling fixed ring is shown at 21, substantially the same as shown in the patent and application above noted, the sliding bolts being indicated at 22 connecting the dial post to the fixed frame ring, the latter being connected by an arm 23 to the posts 24 mounted on the fixed base ring of the machine.

The radially sliding bolts when in their outward position engage notches in the fixed frame ring, and as these bolts are mounted in a part fixed to the dial post the said post, with the dial, will be held against rotation, and will be maintained in proper axial relation to the needle cylinder but the dial might run eccentric or wabble with relation to the cylinder. The sliding bolts are retracted by cams 25 to allow the yarn to pass, it being understood that the bobbin stand 26 rotates with the cam ring of the machine. The retraction of the sliding bolts takes place *seriatim*, and hence one or more of the sliding bolts is always in position to hold the dial post against rotation, but there is nothing provided to prevent the dial wabbling or working eccentric with relation to the cylinder.

From the above it will be seen that my invention secures a relative fixed position axially between the cylinder and dial of the machine, that is to say, the dial and cylinder will maintain their circumferential relation to each other because of the needles when advanced serving as a means of connecting these two parts, the centering means insuring concentric condition between the dial and cylinder.

While I have shown the centering means consisting of the adjustable blocks in connection with the feature of utilizing the projected needles as a means for maintaining a relatively fixed position of the cylinder and dial, the latter feature of my invention is not limited to its use with centering means.

I claim as my invention:

1. In a dogless rib knitting machine, and in combination, a needle cylinder and dial, cylinder and dial needles, said needle cylinder having a radially grooved portion out beyond the circle of cylinder needles to receive the dial needles when advanced for holding the dial and cylinder relatively fixed, cams for the cylinder needles and cams for the dial needles, the said dial cams projecting all the dial needles and in succession to the same extent to knit with the cylinder needles in forming the rib fabric, each dial needle, when fully advanced, remaining both in the groove of the dial and in the groove of the cylinder, substantially as described.

2. In combination in a circular knitting machine, a cylinder and dial, needles, said cylinder having a radially grooved portion to receive the advanced dial needles which thereby act to hold the dial in fixed relation to the cylinder, a revolving cam ring, a yoke supported thereon, a dial post supported in the yoke, a fixed base ring within which the revolving cam ring rotates, a gear for driving the cam ring, and centering means to compensate for the thrust of the driving gear and to hold the dial against tipping in relation to the cylinder, and thereby maintain registration of the radial grooves of the cylinder and dial, said centering means comprising a block or blocks forming the bearing between the revolving cam ring and the fixed ring, and means for adjustably holding said block or blocks, substantially as described.

3. In combination in a circular rib dogless knitting machine, vertical cylinder needles and horizontal dial needles, a cylinder and dial in which the said needles slide, the cylinder having grooves out beyond the plane in which the cylinder needles move to receive the needles of the dial when projected therefrom, thus maintaining a relatively fixed axial position of said cylinder and dial, and an adjustable device on the base ring for centering the dial with the cylinder.

4. In combination in a circular rib dogless knitting machine, a cylinder and dial, cylinder and dial needles, said cylinder having a portion provided with radial grooves to receive the dial needles, and cam means for projecting said dial needles into the radial grooves of the cylinder for holding the dial in fixed axial relation to the cylinder, and adjustable means to center the dial with the cylinder, substantially as described.

5. In a dogless knitting machine, a cylinder and dial, cylinder and dial needles, a ring surrounding the cylinder and grooved radially to receive the dial needles, and cam means for projecting the dial needles into the grooves of the ring to thereby hold the dial in fixed axial relation to the cylinder and adjustable means to center the dial with the cylinder, substantially as described.

6. In combination in a circular dogless knitting machine, a cylinder and dial, said cylinder having a grooved ring portion to receive the dial needles when they are projected to hold the dial in fixed axial relation to the cylinder, said ring having slots in which the cylinder needle latches may swing freely, the partition walls of said slots between the needles serving to confine the said latches to the space between the dial needles, substantially as described.

7. In combination in a circular rib knitting machine, a fixed cylinder, a concentric outer fixed base ring, a dial, a rotary cam ring a yoke and posts connected with the cam ring and supporting the dial, and means supported in the fixed base ring and bearing on the cam ring to center the dial with the cylinder, substantially as described.

8. In combination a cylinder and dial with their needles, said cylinder having a ring around its upper portion with slots therein for the passage of the cylinder needles, the walls between said slots confining the latches of the cylinder needles against lateral displacement to prevent them from striking the dial needles in closing, substantially as described.

9. In combination in a dogless rib knitting machine, a vertical cylinder, a horizontal dial, needles for said cylinder and dial, said cylinder having a radially grooved portion to receive the dial needles when advanced, but with their inner ends remaining in the dial grooves, and means for adjusting the dial vertically, the said radial grooves being deep enough to afford by their walls lateral bearing surfaces for the dial needles in all adjustments of the dial, substantially as described.

10. In a dogless knitting machine, a cylinder and dial, cylinder and dial needles, a ring surrounding the cylinder and out beyond the circle of cylinder needles, said ring being grooved radially to receive the dial needles and slotted vertically for the passage of the cylinder needles, and cam means for projecting the dial needles into the radial grooves of said ring while the butt ends of said needles remain in constant engagement with the grooves of the dial to thereby maintain the dial in fixed relation to the needle cylinder, substantially as described.

In testimony whereof, I affix my signature in presence of two witnesses.

FRANK B. WILDMAN.

Witnesses:
ELIHU R. ROBERTS,
OWEN BALLARD.